United States Patent [19]

Vitunic et al.

[11] Patent Number: 4,909,338

[45] Date of Patent: Mar. 20, 1990

[54] METHOD AND APPARATUS FOR SCALE CALIBRATION AND WEIGHING

[75] Inventors: Mark R. Vitunic, Sunnyvale, Calif.; Barry M. Mergenthaler; Gene L. Amacher, both of Cambridge, Ohio

[73] Assignee: NCR Corporation, Dayton, Ohio

[21] Appl. No.: 364,724

[22] Filed: Jun. 12, 1989

[51] Int. Cl.⁴ .................... G01G 19/52; G01G 23/14; G01L 1/22; G01L 25/00

[52] U.S. Cl. .................................. 177/50; 177/25.14; 177/164; 73/1 B; 364/571.01

[58] Field of Search .................. 177/1, 50, 25.14, 164, 177/255; 73/1 B; 364/571.01

[56] References Cited

U.S. PATENT DOCUMENTS

| | | | |
|---|---|---|---|
| 4,070,900 | 1/1978 | Engels | 73/1 B |
| 4,102,420 | 7/1978 | Uyama et al. | |
| 4,254,469 | 3/1981 | Whitely | |
| 4,330,836 | 5/1982 | Donofrio et al. | |
| 4,412,591 | 11/1983 | Reichmuth et al. | |
| 4,466,499 | 8/1984 | Minamida et al. | |
| 4,466,500 | 8/1984 | Mosher et al. | |
| 4,482,022 | 11/1984 | Komoto | 177/255 X |
| 4,509,608 | 4/1985 | Hikita | |
| 4,642,788 | 2/1987 | Haze | |
| 4,660,663 | 4/1987 | Amacher et al. | 177/50 |
| 4,667,757 | 5/1987 | Johnson | |
| 4,715,457 | 12/1987 | Amacher et al. | |
| 4,733,363 | 3/1988 | Yamada et al. | |
| 4,751,661 | 6/1988 | Amacher et al. | 364/567 |
| 4,760,539 | 7/1988 | Amacher et al. | 364/571 |
| 4,815,547 | 3/1989 | Dillon et al. | 177/255 X |
| 4,848,477 | 7/1989 | Oldendorf et al. | 177/255 X |
| 4,850,442 | 7/1989 | Naito et al. | 73/1 B |

Primary Examiner—George H. Miller, Jr.
Attorney, Agent, or Firm—Wilbert Hawk, Jr.; Albert L. Sessler, Jr.

[57] ABSTRACT

A scale utilizes a plurality of load cells positioned beneath a weighing platform for determining the weight of objects placed upon the platform. During a weighing operation, each load cell generates a voltage proportional to the response of said cell to the application of a weight to the platform. Each such generated voltage is transmitted serially through a multiplexer and is converted to a digital value by an analog-to-analog converter. These digital values are employed by a microprocessor to determine the weight of the object placed on the weighing platform. The scale is calibrated by weighing a test weight in a plurality of different locations on the weighing platform, and utilizing the individual digital values thus obtained for each load cell in a plurality of simultaneous equations, which are then solved in the microprocessor to provide constant values associated with each load cell, which are used in subsequent weighing operations.

16 Claims, 5 Drawing Sheets

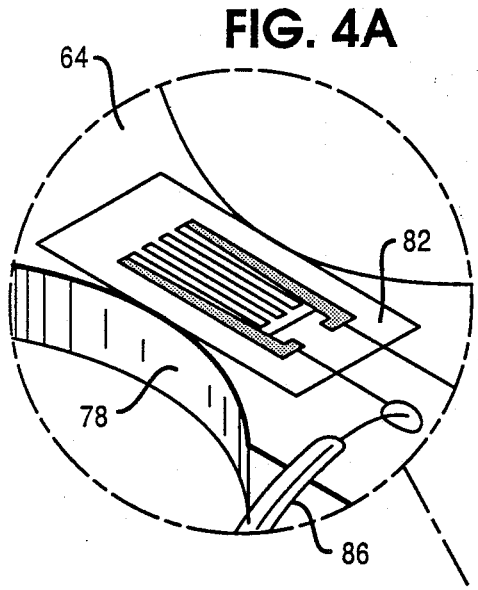
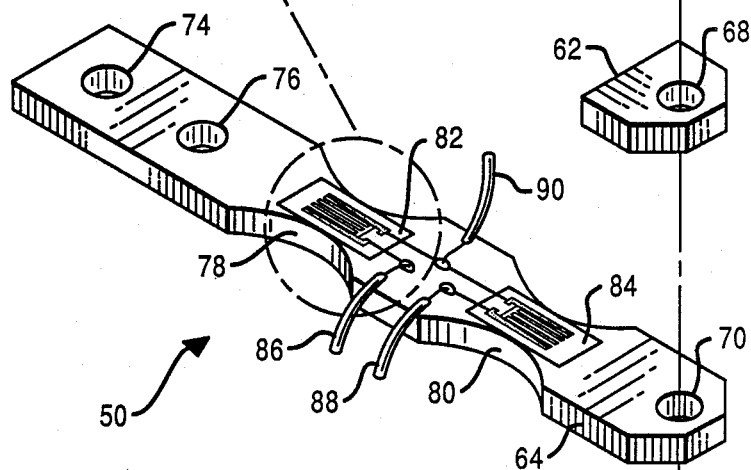
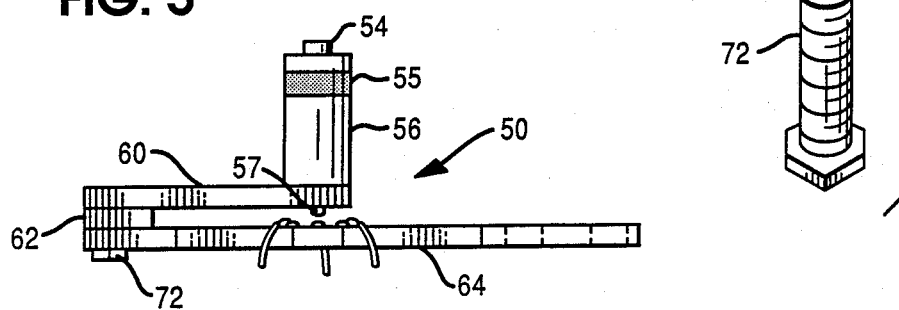
FIG. 4A
FIG. 4
FIG. 5

METHOD AND APPARATUS FOR SCALE CALIBRATION AND WEIGHING

BACKGROUND OF THE INVENTION

The present invention is directed to weight measurement, and more particularly is directed to a method of scale calibration and weighing, using an electronic scale.

Weighting scales are widely used in supermarkets or the like for weighing produce or other merchandise items and must meet stringent requirements as to performance and cost. The scales must be accurate enough to satisfy public weights and measures authorities. These requirements are usually met at the time that the scale is manufactured by an initial adjustment. As part of these requirements, the scale must display a predetermined reference value, normally zero, when no merchandise item is begin weighed so that the change in the output display produced by a merchandise item being weighed will accurately represent the true weight of the item. Through use, the zero reference of a scale may change due to a number of causes, including the following: accumulation of foreign matter on the scale platform or its supports; a change in the position of the scale platform; the effect of temperature on the load cells and electronic components; and hysteresis, especially after weighing of a heavy object. In certain types of electric scales which employ a plurality, typically four, of strain gauges, as a means of measuring the weight, these strain gauges are usually configured in a Wheatstone bridge circuit for increased accuracy because their fractional change in resistance when strained by a force is very small (for metal-wire strain gauges, typically of the order of 0.1%). The signal outputs from the strain gauges in the Wheatstone bridge circuit are summed algebraically to provide a signal representative of the weight being determined. In such precision scale applications, the strain gauges must have precisely equal sensitivities, i.e. the same fractional change in resistance when strained by the same force centered at the same relative position. In at least one type of scale, this achievement of equal sensitivities is accomplished by precisely sanding the bases of the strain gauges, a slow, expensive, labor-intensive method.

SUMMARY OF THE INVENTION

The requirement for hand-sanding the bases of the strain gauges, referred to above, can be overcome by determining the relative sensitivities of the unsanded strain gauges during calibration of the scale, and using the constants representing such relative sensitivities in determining unknown weights. This may be accomplished by providing a Wheatstone bridge configuration for each pair of strain gauges and monitoring these Wheatstone bridge configurations.

In accordance with one embodiment of the invention, a method for calibrating an electronic scale having a plurality of load cells for supporting a weighing platform and for generating a voltage proportional to the response of each load cell to the application of a weight to said platform, a corresponding plurality of amplifiers coupled to said load cells, a multiplexer coupled to said amplifiers for sequentially receiving said voltages from said amplifiers, an analog-to-digital converter coupled to said multiplexer for converting voltages representative of load cell responses received from said multiplexer to digital values, microprocessor means coupled to said analog-to-digital converter for receiving and utilizing said digital values, and a display controlled by said microprocessor means, said method comprises the following steps: (a) performing a test operation without weight on said weighing platform to determine whether said scale is properly calibrated to zero weight; (b) if said scale is not properly calibrated to zero weight, operating a calibration switch to initiate a calibration operation; (c) displaying on said display an instruction to the scale operator to place predetermined test weights at predetermined positions on the weighing platform; (d) performing a plurality of weighing operations equal in number to the load cells and for each weighing operation obtaining a digital value representing the response of each load cell; (e) solving by said microprocessor means a plurality of simultaneous equations equal in number to the number of load cells to derive a plurality of constants, one of said constants being associated with each of said load cells; (f) storing said plurality of constants in a memory included in said microprocessor means for use in future weighings by said electronic scale; and (g) operating said calibration switch to terminate the calibration operation.

In accordance with a second embodiment of the invention, a method for weighing an object, using an electronic scale having a plurality of load cells for supporting a weighing platform and for generating a voltage proportional to the response of each load cell to the application of a weight to said platform, a corresponding plurality of amplifiers coupled to said load cells, a multiplexer coupled to said amplifiers for sequentially receiving said voltages from said amplifiers, an analog-to-digital converter coupled to said multiplexer for converting voltages representative of load cell responses received from said multiplexer to digital values, microprocessor means coupled to said analog-to-digital converter for receiving and utilizing said digital values, and a display controlled by said microprocessor means, said method comprising the following steps: (a) performing a test operation without weight on said weighing platform to determine whether said scale is properly calibrated to zero weight; (b) if said scale is not properly calibrated to zero weight, operating a calibration switch to initiate a calibration operation; (c) displaying on said display an instruction to the scale operator to place predetermined test weights at predetermined positions on the weighing platform; (d) performing a plurality of weighing operations equal in number to the number of load cells and for each weighing operation obtaining a digital value representing the response of each load cell; (e) solving by said microprocessor means a plurality of simultaneous equations equal in number to the number of load cells to derive a plurality of constants, one of said constants being associated with each of said load cells; (f) storing said plurality of constants in a memory included in said microprocessor means for use in future weighings by said electronic scale; (g) operating said calibration switch to terminate the calibration operation; (h) proceeding with a weighing operation for determining an unknown weight by placing the object to be weighed on the weighing platform and obtaining a value for each of the load cells; and (i) solving by said microprocessor means an equation using the load cell values and the constants which were obtained in step (e) and stored in a memory in step (f), to determine the unknown weight.

In accordance with a third embodiment of the invention, apparatus for calibration of an electronic scale comprises: a weighing platform for receiving an object whose weight is to be determined; a plurality of load cells supporting said weighing platform and capable of producing a change in electrical signal in response to a change of weight on said platform; a plurality of amplifiers, each associated with one of said load cells, to amplify the electrical signals produced by said load cells; a multiplexer coupled to said amplifiers for sequentially receiving said amplified signals from said load cells; an analog-to-digital converter coupled to said multiplexer for sequentially receiving said signals relating to said load cells from said multiplexer and digitizing them; and microprocessor means coupled to said analog-to-digital converter for receiving and utilizing said digitized signals in the solution of simultaneous equations to develop constants which are associated with the various load cells in the weighing of objects by said electronic scale, said microprocessor means being coupled to said multiplexer for control of said multiplexer.

It is accordingly an object of the present invention to provide a novel method of scale calibration.

A further object is to provide a novel method of weighing using a calibrated electronic scale.

A further object is to provide a novel method of scale calibration in which load cells employed in the scale are monitored individually to provide constant values for calibration purposes which are subsequently employed in weighing operations.

A further object is to provide a novel method of scale calibration in which a plurality of simultaneous equations are solved to provide constant values which are associated with individual load cells of an electronic scale for subsequent weighing operations of the scale.

A further object is to provide a novel apparatus for electronic scale calibration.

With these and other objects, which will become apparant from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 4 is an exploded view showing a load cell assembly, including a pair of strain gauges secured thereto;

FIG. 5 is an elevation of the load cell of FIG. 4;

DESCRIPTION OF THE PREFERRED EMBODIMENT

Figure 1:
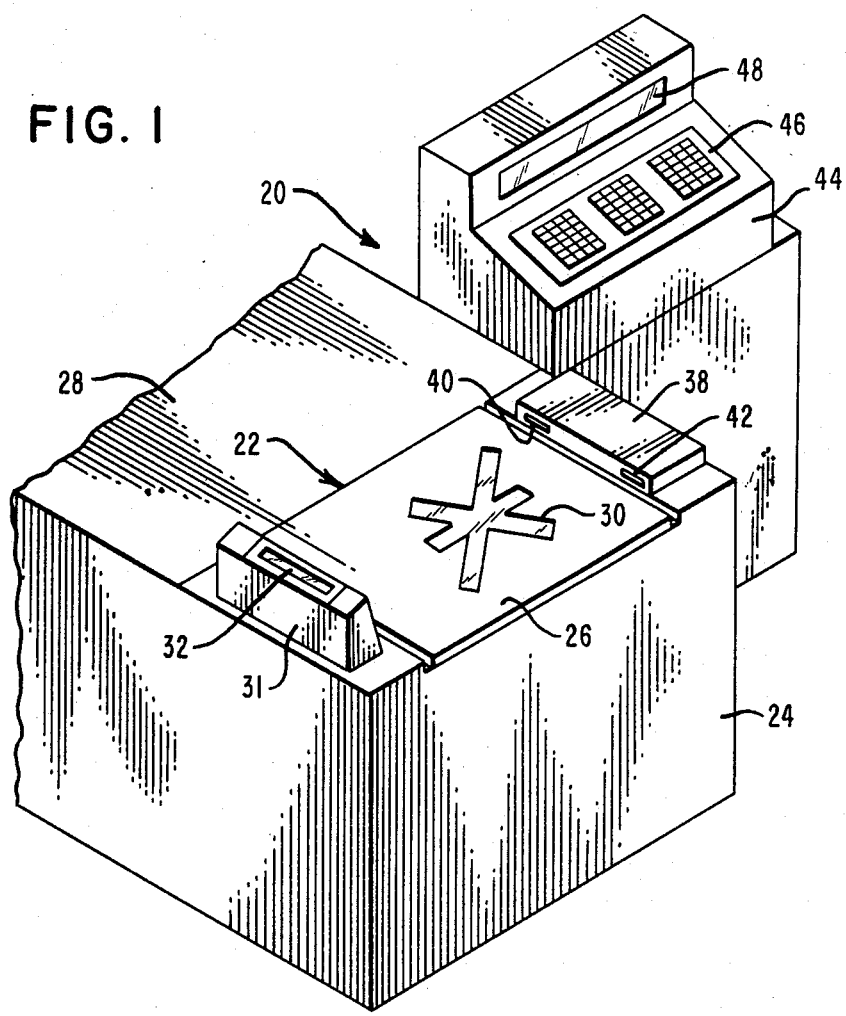
FIG. 1 is a perspective view of a check-out system which includes a scale for weighing purchased merchandise.

Referring now to FIG. 1 there is shown a perspective view of a merchandise check-out system generally indicated by the reference numeral 20, in which a scale 22 is utilized to weigh a purchased item. The scale is located within a check-out counter 24 and includes a scale lid or load plate 26 movably mounted flush with the top surface 28 of the check-out counter 24. The scale lid 26 includes an aperture 30 through which scanning beams from a scanner assembly (not shown) mounted beneath the scale within the check-out counter are projected for scanning a bar code label (not shown) on a merchandise item positioned on the scale lid 26 in a manner that is well known in the art. Mounted adjacent to the scale lid 26 on the surface 28 of the check-out counter 24 is a housing member 31 in which is located a customer display 32 which displays the price of the merchandise item and also the weight of the item as the result of wa weighing operation. Located adjacent on either side of the display 32 within the housing 31 are a pair of signal lights 98 and 100, one green and one red, which are operated to indicate whether or not a weighing operation or a scanning operation was successful. Opposite the housing 31 on the surface 28 of the counter 24 is a housing 38 in which is located a pair of photoelectric cells 40 and 42 which detect the entrance and the exit of the merchandise item on the lid 26. A pair of light-emitting diodes (not shown) located in the housing member 31 directs light beams at the cells 40 and 42 in a manner that is well-known in the art. Mounted adjacent the check-out counter 24 is a data terminal device 44 for processing the sales transaction which includes a keyboard 46 and a display 48. The display 32 is an alphanumeric LCD display and can be operated automatically or by the manual operation of a key of the keyboard 46 of the data terminal device 44.

Figure 3:
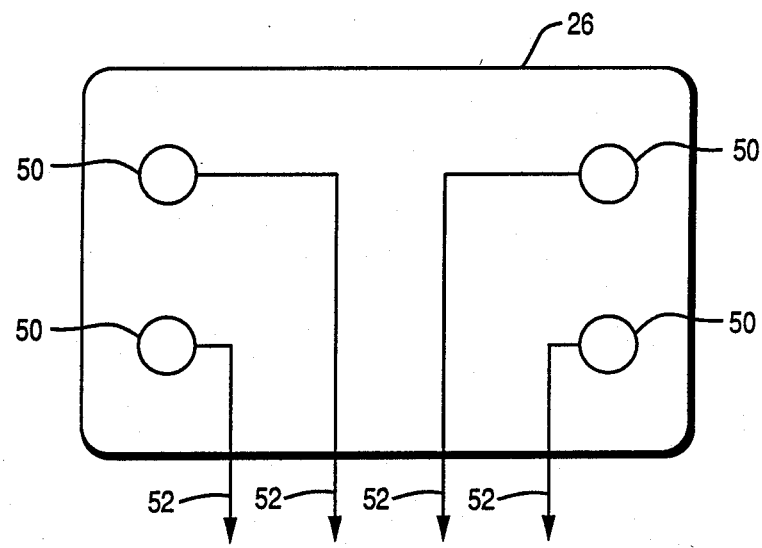
FIG. 3 is a schematic representation of a portion of the check-out system of FIG. 1, showing the weighing platform and the load cells associated therewith.

Referring now to FIG. 3, there is shown a schematic partial representation of the check-out system in which the scale includes four load cells 50 secured to the scale lid 26 and which cells provide output analog signals over lines 52 in response to the placing of a weighted item on the scale lid 26. the structure of the load cells 50 is shown in greater detail in FIGS. 4 and 5. Each load cell 50 includes a cylindrical element 56 which has at its upper end a stud 54 which is engageable with a corresponding aperture in the scale lid 26. The cylindrical element includes a resilient portion 55 intermediate its ends. At its lower end, the cylindrical element 56 is provided with a threaded extension 57 which engages a complementary threaded aperture 58 adjacent to one end of a plate 60. As best shown in FIG. 5, the plate 60 is assembled to a lower plate 64 with a spacer 62 being positioned therebetween. This assembly is secured together by a threaded fastener 72, which engages with threaded aperture 66, and with apertures 68 and 70 in the plate 60, the spacer 62 and the lower plate 64, respectively. The lower plate 64 is formed with two portions 78 and 80 of reduced cross-section, on which are secured two strain gauges 82 and 84. These gauges, as is well known, measure the deflection of an element to which they are secured. They have a comb-like structure and include two electrical terminations. One of the terminations of the strain gauge 82 is connected to a conductor 86, and a corresponding termination of the strain gauge 84 is connected to a conductor 88. The remaining terminations of the strain gauges 82 and 84 are connected together and to a common conductor 90.

In the past, calibration of a load cell has been accomplished by precisely sanding the lower surfaces of the reduced sections 78 and 80 of the lower plate 64 in order to modify the response of the strain gauges associated with the reduced sections to provide a zero scale reading of the scale in which the load cell is employed when no load appears on the scale lid 26. It may readily be seen that such a method of calibration is quite time-consuming and labor-intensive, and that it may be quite difficult to achieve a high degree of accuracy using such a method.

Figure 2:
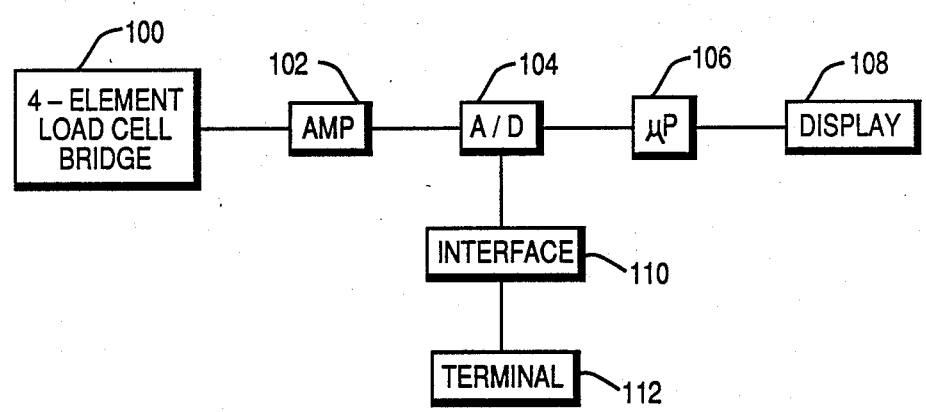
FIG. 2 shows a prior art circuit arrangement for an electronic scale.

The manner in which the electrical signal information taken from the strain gauges 82, 84 of the load cells 50 was previously used to provide the weight of objects weighed on the scale 22 is shown diagrammatically in FIG. 2, which is labelled as PRIOR ART. In this arrangement, the two strain gauges 82 and 84 of each load cell 50, taken together, formed one element of a four-element load cell bridge 100, which functioned in the manner of a Wheatstone bridge, to provide an analog output signal representative of the weight of an object being weighed. This analog output signal was amplified by an amplifier 102, digitized by an analog-to-digital converted 104, and applied to a microprocessor 106 to cause a numerical value representative of the weight to be displayed on a display 108. From the analog-to-digital converter 104, the digitized signal could also be transmitted through an interface device 110 to a terminal 112, such as the terminal 44.

Figure 6:
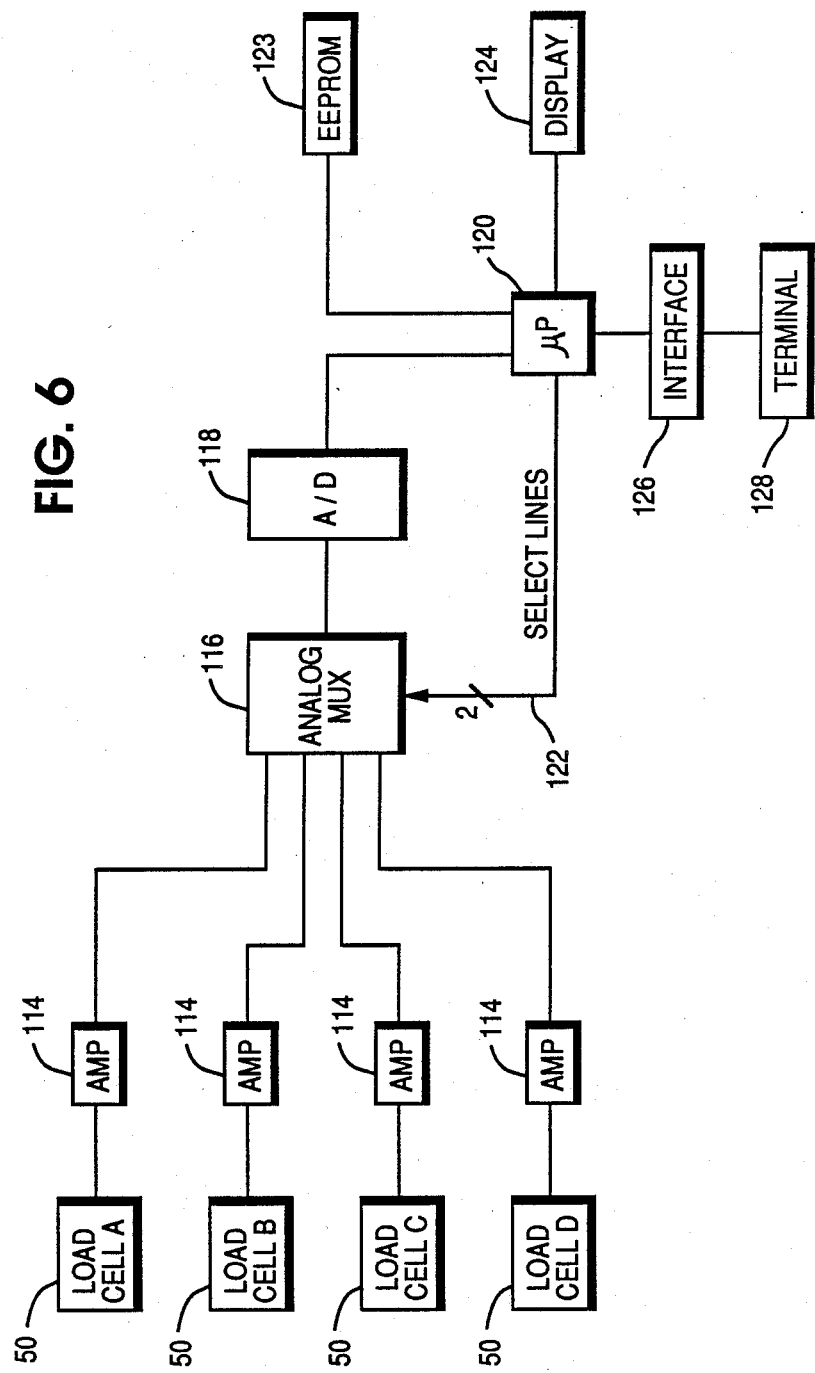
FIG. 6 is a diagram of a circuit arrangement employed in the present invention.

In the present invention, the circuit shown diagrammatically in FIG. 6 is employed in place of the circuit of FIG. 2. Each load cell 50 is connected through its own amplifier 114 to one input of an analog multiplexer 116. The output of the multiplexer 116 is connected to an analog-to-digital converter 118, the output of which is connected to a microprocessor 120, which has an electrically erasable programmable read-only memory (EEPROM) 123 operationally associated therewith. The microprocessor 120 is coupled to the multiplexer 116 by select lines 122 to cause the multiplexer 116 to transmit the amplified signals from the various load cells 50 serially to the analog-to-digital converter 118, where these signals are sequentially digitized and applied to the microprocessor 120. As will subsequently be described in greater detail, the microprocessor 120 will then determine the weight of the object being weighed from the values received from the analog-to-digital converter 118, and will cause that weight to be displayed on a display 124. The weight value may also be transmitted to a terminal 128, such as the terminal 44, through an interface 126.

Figure 7:
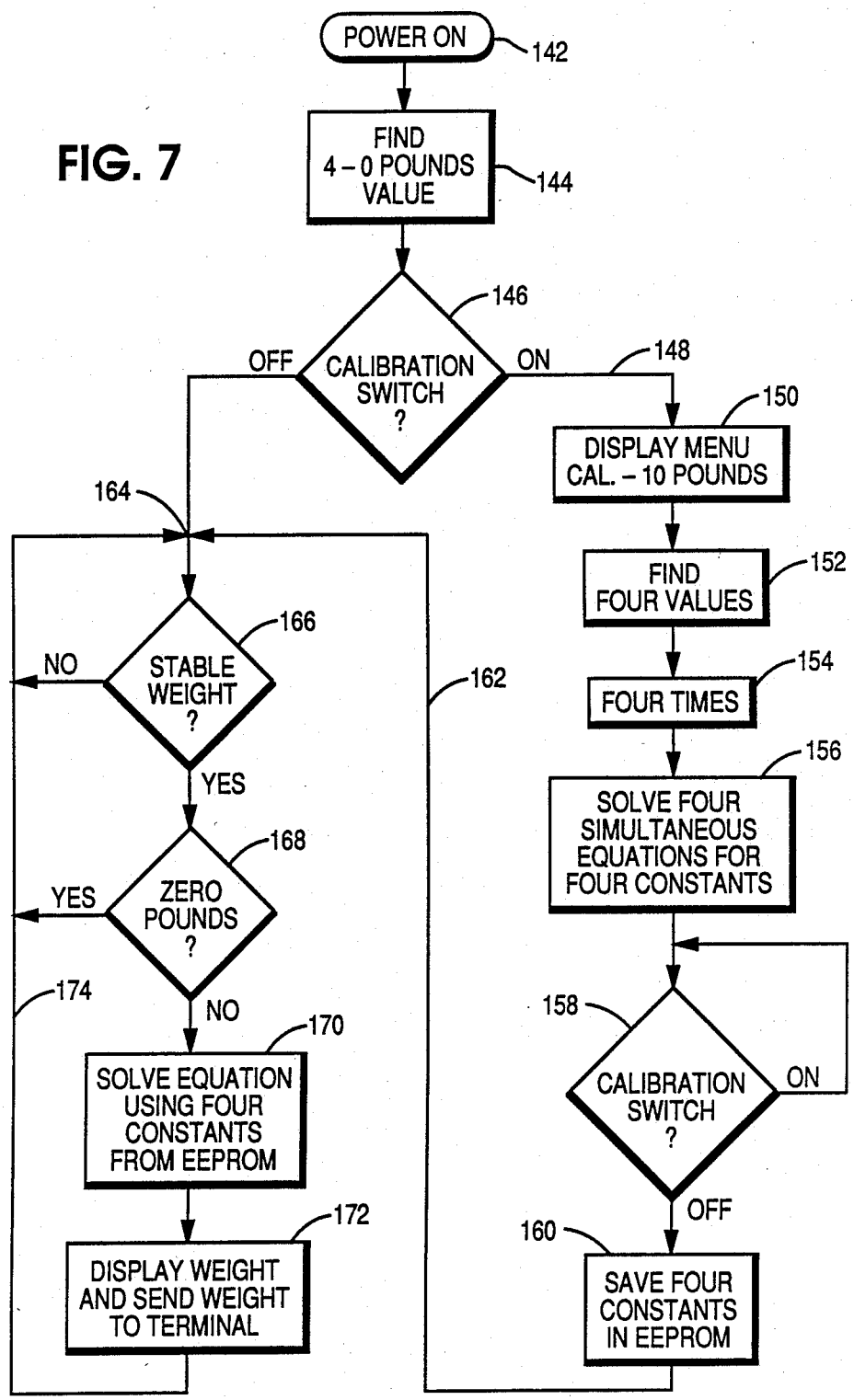
FIG. 7 is a flow diagram of the calibration and weighing processes of the present invention.

Referring now to FIG. 7, shown there is a flow diagram of the scale calibration and weighing process 140, as performed by a scale such as the scale 22 in accordance with the present invention.

This process is initiated by turning on electrical power to the scale 22 of the check-out system 20, as is represented by the block 142. The microprocessor 120 then cause a number of "zero" weighings to take place, without having any weight placed upon the scale lid 26, as represented by block 144. These weighings give values representing zero weight for the various load cells 50, and the resulting values are averaged on an ongoing basis to provide updated values which compensate for any changing conditions such as, for example, changes in ambient temperature as the day progresses. The zero values are utilized to provide base points for the load cells 50 when actual weighings take place.

As the next step in the process 140, a determination is made (decision block 146) as to whether or not a calibration operation is required. If so, a calibration switch, which may be located at any convenient position on the scale 22 or elsewhere on the system 20, is turned on by a service technician, by a person from a Bureau of Standards or Bureau of Weights and Measures, or by some other authorized individual. In the event that no calibration operation is required, the calibration switch is retained or placed in an "off" position, and normal weighing operations will be performed by the scale 22, as will subsequently be described in greater detail.

Assuming that a calibration operation is required and that the calibration switch has been turned on, the process continues along path 148 to the block 150. At this time, a menu is displayed on the display 48 of the data terminal device 44, containing instructions as to how to perform the calibration operation. In the first step of this operation, a weight of predetermined amount (say ten pounds) is selected and is sequentially placed in four different locations on the scale lid 26, with a separate weighing operating being performed for each placement. The positions in which the weight is to be placed can be shown in any suitable manner on the display, as for example by showing on the display an outline of the scale lid 26, and showing a dot or circle where the weight is to be placed for each separate weighing. For each of the four weighings, the weight may be placed at a different corner of the scale, for example. Each separate weighing is represented by the block 152. As shown in that block, four different values are obtained, one relating to each of the four load cells 50. As represented in block 154, four different weighings are performed, each with the calibration weight in a different position.

Next, as represented in block 156, the four different values for each of the four different load cells are utilized in four different simultaneous equations, which are solved by the microprocessor 120 to obtain four different constants, each of which is associated with one of the four load cells. the equations may take the following form:

$$A_x(A_1) + B_x(B_1) + C_x(C_1) + D_x(D_1) = W$$

$$A_x(A_2) + B_x(B_2) + C_x(C_2) + D_x(D_2) = W$$

$$A_x(A_3) + B_x(B_3) + C_x(C_3) + D_x(D_3) = W$$

$$A_x(A_4) + B_x(B_4) + C_x(C_4) + D_x(D_4) = W$$

wherein W is the calibration weight; $A_{1-4}$, $B_{1-4}$, $C_{1-4}$, and $D_{1-4}$ are load cell data readings; and $A_x$, $B_x$, $C_x$, and $D_x$ are unknown linear coefficients.

When values for the four constants $A_x$, $B_x$, $C_x$, and $D_x$ have been obtained by solution of the above equations, they are retained in temporary storage in the microprocessor 120 until the calibration switch has been turned off (block 158), at which time they are stored in the electrically erasable programmable read-only memory (EEPROM) 123 which is associated with the microprocessor 120, as represented in block 160.

With the calibration switch turned off (block 158) and the constants stored (block 160), the process 140 continues, as represented by path 162 in FIG. 7, to a point at which an operation of weighing an unknown weight which is placed upon the scale lid 26 of the scale 22 may take place. As represented in FIG. 7, the path 162 extends to a junction of several paths in the process 140, designated by the point 164. It will be assumed that an object of unknown weight has been placed upon the scale lid 26. A determination is then made, as represented in block 168, as to whether or not the reading for the weight on the scale lid 26 has stabilized, or is continuing to swing back and forth, as may be the case, for example, when the weight is initially placed on the scale lid 26. If the weight has not yet stabilized, the process 140 continues to loop through the block 166 until such stability is achieved. Once this has happened, the process continues on to block 168, in which a determination is made as to whether or not the weight being read is zero pounds. If the weight is, in fact, zero pounds, the process 140 returns to the junction 164, in preparation for the next weighing operation. If desired, the process 140 can, at this time, cause a number of "zero" weighings to take place, as previously described in connection with block 144, in order to provide updated values for the various load cells 50 to compensate for changing conditions.

If the weight is not zero pounds, the process 140 continues to block 170, in which the weight of the object being weighed is computed by the microprocessor 120, based upon the values measured for the four load cells 50, and using the constants for the four load cells which were determined during the most recent calibration operation. The unknown weight is determined by linear extrapolation governed by the following equation:

$$Wt = \sum_{i=1}^{4} [A/D_{out}(i) - \text{Zero } Wt(i)] \text{ Const } (i)$$

wherein Wt is the unknown weight; i represents the individual load cells 50 (a total of four in number); $A/D_{out}$ represents the output value from the analog-to-digital converter 118 for a given load cell; Zero Wt represents the zero-weight value for a given load cell; and Const represents the constant value for a given load cell 50 as determined during the calibration operation described above.

Note that it is possible to have a negative signal (relative to the zero weight A/D reading) induced at the load cell output if, for example, a heavy weight is centered at a corner opposite one of the load cells. The net effect is a negative contribution to the overall weight as seen by that particular load cell, since the scale lid 26 would be lifted slightly at that point due to the heavy weight applied to the opposite corner, and this negative contribution must be included in the equation. Best results are normally obtained if the calibration is done with a weight which is near the middle of a full scale in value, so as to avoid extrapolation too far in either direction. For a 30 pound scale, 10 or 15 pounds is sufficient.

Greater scale accuracy can be obtained by compensating for the shift in the unstrained resistance value (and thus the zero weight readings of the analog-to-digital converter 118) which takes place which changes in temperature. This relationship has been tested and shown to be linear as well. With two-point predictability, a temperature constant can be determined for each load cell 50. The temperature can then be monitored with respect to some reference (such as room temperature), and the zero weight readings can be adjusted in accordance with the following equation:

Zero $Wt(i)$=Zero $Wt(i)|_T$+[Zero $Wt(i)|_T$−Zero $Wt(I)=T_{ref}$]TempConst($i$)

wherein T represents actual temperature, $T_{ref}$ represents a reference temperature, such as room temperature, and TempConst(i) represents a temperature variance constant for a given load cell.

After the weight of the object to be weighed has been determined using the equation for Wt set forth above, the process continues by displaying the weight in the display 32 and transmitting the weight value to the terminal device 44, as represented in block 172. The process 140 can then return via path 174 to the junction 164, for another weighing operation.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. A method for calibrating an electronic scale having a plurality of load cells for supporting a weighing platform and for generating a voltage proportional to the response of each load cell to the application of a weight to said platform, a corresponding plurality of amplifiers coupled to said load cells, a multiplexer coupled to said amplifiers for sequentially receiving said voltages from said amplifiers, an analog-to-digital converter coupled to said multiplexer for converting voltages representative of load cell responses received from said multiplexer to digital values, microprocessor means coupled to said analog-to-digital converter for receiving and utilizing said digital values, and a display controlled by said microprocessor means, said method comprising the following steps:

(a) performing a test operation without weight on said weighing platform to determine whether said scale is properly calibrated to zero weight;

(b) if said scale is not properly calibrated to zero weight, operating a calibration switch to initiate a calibration operation;

(c) displaying on said display an instruction to the scale operator to place predetermined test weights at predetermined positions on the weighing platform;

(d) performing a plurality of weighing operations equal in number to the number of load cells and for each weighing operation obtaining a digital value representing the response of each load cell;

(e) solving by said microprocessor means a plurality of simultaneous equations equal in number to the number of load cells to derive a plurality of constants, one of said constants being associated with each of the said load cells;

(f) storing said plurality of constants in a memory included in said microprocessor means for use in future weighings by said electronic scale; and (g) operating said calibration switch to terminate the calibration operation.

2. The method of claim 1 in which the number of load cells is four.

3. The method of claim 1 in which the test weights each weigh ten pounds.

4. The method of claim 1 in which the simultaneous equations referred to in step (e) are as follows:

$$A_x(A_1) + B_x(B_1) + C_x(C_1) + D_x(D_1) = W$$

$$A_x(A_2) + B_x(B_2) + C_x(C_2) + D_x(D_2) = W$$

$$A_x(A_3) + B_x(B_3) + C_x(C_3) + D_x(D_3) = W$$

-continued $$A_x(A_4) + B_x(B_4) + C_x(C_4) + D_x(D_4) = W$$

wherein W is the calibration weight; $A_{1-4}$, $B_{1-4}$, $C_{1-4}$, and $D_{1-4}$ are load cell data readings; and $A_x$, $B_x$, $C_x$, and $D_x$ are unknown linear coefficients.

5. A method for weighing an object, using an electronic scale having a plurality of load cells for supporting a weighing platform and for generating a voltage proportional to the response of each load cell to the application of a weight to said platform, a corresponding plurality of amplifiers coupled to said load cells, a multiplexer coupled to said amplifiers for sequentially receiving said voltages from said amplifiers, an analog-to-digital converter coupled to said multiplexer for converting voltages representative of load cell responses received from said multiplexer to digital values, microprocessor means coupled to said analog-to-digital converter for receiving and utilizing said digital values, and a display controlled by said microprocessor means, said method comprising the following steps:
  (a) performing a test operation without weight on said weighing platform to determine whether said scale is properly calibrated to zero weight;
  (b) if said scale is not properly calibrated to zero weight, operating a calibration switch to initiate a calibration operation;
  (c) displaying on said display an instruction to the scale operator to place predetermined test weights at predetermined positions on the weighing platform;
  (d) performing a plurality of weighing operation equal in number to the number of load cells and for each weighing operation obtaining a digital value representing the response of each load cell;
  (e) solving by said microprocessor means a plurality of simultaneous equations equal in number to the number of load cells to derive a plurality of constants, one of said constants being associated with each of said load cells;
  (f) storing said plurality of constants in a memory included in said microprocessor means for use in future weighings by said electronic scale;
  (g) operating said calibration switch to terminate the calibration operation;
  (h) proceeding with a weighing operation for determining an unknown weight by placing the object to be weighed on the weighing platform and obtaining a value for each of the load cells; and
  (i) solving by said microprocessor means an equation using the load cell values and the constants which were obtained in step (e) and stored in a memory in step (f), to determine the unknown weight.

6. The method of claim 5, also including the following additional steps:
  (j) determining whether or not the resulting weight is zero; and
  (k) if said resulting weight is not zero, displaying it on said display.

7. The method of claim 5, in which the number of values obtained is four.

8. The method of claim 5, in which said electronic scale is coupled to a business terminal, also including the step of transmitting the weight obtained in step (i) to said business terminal.

9. The method of claim 5, in which the simultaneous equations referred to in step (e) are as follows:

$$A_x(A_1) + B_x(B_1) + C_x(C_1) + D_x(D_1) = W$$

$$A_x(A_2) + B_x(B_2) + C_x(C_2) + D_x(D_2) = W$$

$$A_x(A_3) + B_x(B_3) + C_x(C_3) + D_x(D_3) = W$$

$$A_x(A_4) + B_x(B_4) + C_x(C_4) + D_x(D_4) = W$$

wherein W is the calibration weight; $A_{1-4}$, $B_{1-4}$, $C_{1-4}$, and $D_{1-4}$ are load cell data readings; and $A_x$, $B_x$, $C_x$, and $D_x$ are unknown linear coefficients.

10. The method of claim 5 in which the equation of step (i) is as follows:

$$Wt = \sum_{i=1}^{4} [A/D_{out}(i) - \text{Zero } Wt(i)] \text{ Const }(i)$$

wherein Wt is the unknown weight; i represents the individual load cells; $A/D_{out}$ represents the output value from the analog-to-digital converter for a given load cell; Zero Wt represents the zero-weight value for a given load call; and Const represents the constant value for a given load cell as determined during the calibration operation.

11. Apparatus for calibration of an electronic scale comprising:
  a weighing platform for receiving an object whose weight is to be determined;
  a plurality of load cells supporting said weighing platform and capable of producing a change in electrical signal in response to a change of weight on said platform;
  a plurality of amplifiers, each associated with on of said load cells, to amplify the electrical signals produced by said load cells;
  a multiplexer coupled to said amplifiers for sequentially receiving said amplified signals from said load cells;
  an analog-to-digital converter coupled to said multiplexer for sequentially receiving said signals relating to said load cells from said multiplexer and digitizing them; and
  microprocessor means coupled to said analogto-digital converter for receiving and utilizing said digitized signals in the solution of simultaneous equations to develop constants which are associated with the various load cells in the weighing of objects by said electronic scale, said microprocessor means being coupled to said multiplexer for control of said multiplexer.

12. The apparatus of claim 11, also including a display which is coupled to and controlled by said microprocessor means for the display of calibration instructions to the scale operator for the placement of predetermined test weights at predetermined positions on the weighing platform.

13. The apparatus of claim 12, in which the test weights each weigh ten pounds.

14. The apparatus of claim 11, also including a calibration switch which must be actuated in order for said apparatus to perform a calibration operation.

15. The apparatus of claim 11, in which the number of load cells is four.

16. The apparatus of claim 15, in which the weighing platform is of generally rectangular configuration and the load cells are located adjacent to the four corners of the weighing platform.

* * * * *

UNITED STATES PATENT AND TRADEMARK OFFICE
CERTIFICATE OF CORRECTION

PATENT NO.   : 4,909,338
DATED        : March 20, 1990
INVENTOR(S)  : Mark R. Vitunic et al.

It is certified that error appears in the above-identified patent and that said Letters Patent is hereby corrected as shown below:

Column 8, line 51, delete "the".

Column 9, line 33, delete "operation" and substitute
--operations--.

Column 10, line 33, delete "on" and substitute
--one--.

Column 10, line 43, delete "analogto-digi-" and substitute
--analog-to-digi- --.

Signed and Sealed this

Fourteenth Day of May, 1991

Attest:

HARRY F. MANBECK, JR.

*Attesting Officer*   Commissioner of Patents and Trademarks